United States Patent
Dominguez, Jr. et al.

[11] Patent Number: 5,864,449
[45] Date of Patent: Jan. 26, 1999

[54] PRECISION LIMIT STOP FOR HIGH DENSITY DISK DRIVES

[75] Inventors: Miguel Dominguez, Jr., San Jose; David McMurtry, San Juan Bautista; Anthony Vesci, San Jose, all of Calif.

[73] Assignee: International Business Machines Corporation, Armonk, N.Y.

[21] Appl. No.: 918,662

[22] Filed: Aug. 22, 1997

[51] Int. Cl.[6] .................................................. G11B 21/22
[52] U.S. Cl. .................................................. 360/105
[58] Field of Search ..................................... 360/105, 106

[56] References Cited

U.S. PATENT DOCUMENTS

| | | | |
|---|---|---|---|
| 4,110,802 | 8/1978 | Ho et al. ................................. | 360/106 |
| 4,346,416 | 8/1982 | Riggle et al. ........................... | 360/106 |
| 4,603,363 | 7/1986 | Rickert et al. ................... | 360/97.01 X |
| 4,635,151 | 1/1987 | Hazebrouck ........................... | 360/105 |
| 4,716,482 | 12/1987 | Walsh ..................................... | 360/106 |
| 4,796,131 | 1/1989 | Chang .................................... | 360/106 |
| 4,947,274 | 8/1990 | Casey et al. ........................... | 360/105 |
| 4,949,206 | 8/1990 | Phillips et al. ........................ | 360/106 |
| 5,034,837 | 7/1991 | Schmitz ................................. | 360/105 |
| 5,134,608 | 7/1992 | Strickler et al. ................... | 360/105 X |
| 5,170,300 | 12/1992 | Stefansky .............................. | 360/105 |
| 5,262,912 | 11/1993 | Hudson et al. ....................... | 360/105 |
| 5,262,913 | 11/1993 | Stram et al. .......................... | 360/105 |
| 5,365,389 | 11/1994 | Jabbari et al. ........................ | 360/105 |
| 5,369,538 | 11/1994 | Moe et al. ............................. | 360/106 |
| 5,402,290 | 3/1995 | Daniel .................................... | 360/106 |
| 5,455,726 | 10/1995 | Liu ......................................... | 360/106 |
| 5,523,912 | 6/1996 | Koriyama .............................. | 360/106 |

FOREIGN PATENT DOCUMENTS

| | | | |
|---|---|---|---|
| 2-291764 | 12/1987 | Japan ............................ | G11B 21/02 |
| 2-134773 | 5/1990 | Japan ............................ | G11B 21/02 |
| 3-69074 | 3/1991 | Japan ............................ | G11B 21/22 |

*Primary Examiner*—John H. Wolff
*Attorney, Agent, or Firm*—Noreen A. Krall

[57] ABSTRACT

A limit stop for magnetic storage disk drive systems comprising a spring portion and a mount portion. The spring portion is a single piece molded structure that is preloaded against a precision machined surface on the mount portion during assembly. The preloaded spring feature provides good energy absorption characteristics to reduce the limit stop deflection during actuator contact. The precision machined surface on the mount portion accurately determines the limit stop position, thereby reducing tolerance requirements on the spring portion.

20 Claims, 6 Drawing Sheets

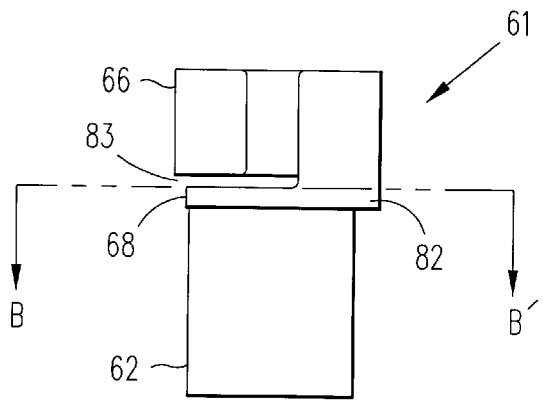
FIG. 5a
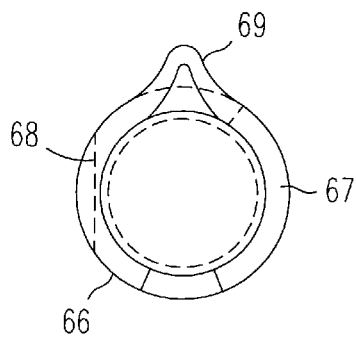
FIG. 5b
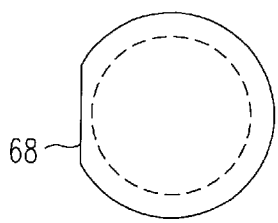
SECTION B-B'
FIG. 5c
FIG. 5
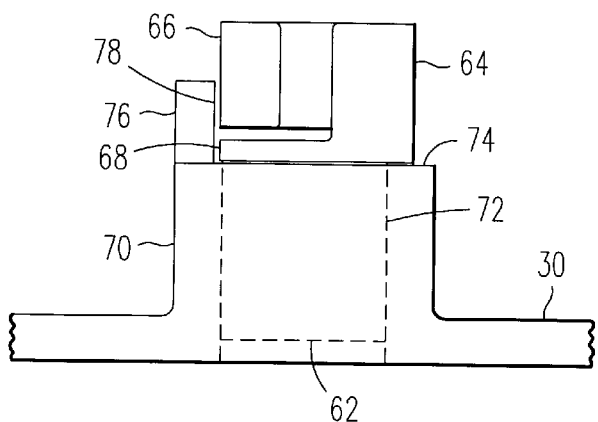
FIG. 6a
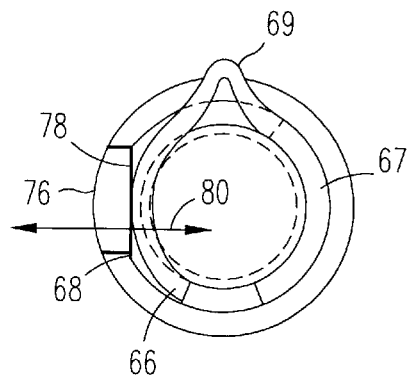
FIG. 6b
FIG. 6

PRECISION LIMIT STOP FOR HIGH DENSITY DISK DRIVES

BACKGROUND OF THE INVENTION

1. Field of the Invention

This invention relates in general to disk drives, and in particular to limit stops in the disk drives whose function is to limit the extent of actuator radial motion, to define the usable radius of the disk surfaces and to protect the suspension and slider from damage due to contact with the disk stack hub at the inner diameter of the disk or due to running off the disk surface at the outer diameter of the disk.

2. Description of Related Art

Moving magnetic storage devices, especially magnetic disk drives, are the memory devices of choice. This is due to their expanded non-volatile memory storage capability combined with a relatively low cost.

Magnetic disk drives are information storage devices which utilize at least one rotatable magnetic media disk having concentric data tracks defined for storing data, a magnetic recording head or transducer for reading data from and/or writing data to the various data tracks, a slider for supporting the transducer in proximity to the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the transducer above the data surface of the storage disk by a cushion of air, referred to as an air-bearing, generated by the rotating disk.

Alternatively, the transducer may operate in contact with the surface of the disk. Thus the suspension provides desired slider loading and dimensional stability between the slider and an actuator arm which couples the transducer/slider/suspension assembly to the actuator. The actuator positions the transducer over the correct track according to the data desired on a read operation or to the correct track for placement of the data during a write operation. The actuator is controlled to position the transducer over the desired data track by shifting the combination assembly across the surface of the disk in a direction generally transverse to the data tracks. The actuator may include a single arm extending from a pivot point, or alternatively a plurality of arms arranged in a comb-like fashion extending from a pivot point. A rotary voice coil motor (vcm) is attached to the rear portion of the actuator arm or arms to power movement of the actuator over the disks.

The vcm located at the rear portion of the actuator arm is comprised of a top plate spaced above a bottom plate with a magnet or pair of magnets therebetween. The vcm further includes an electrically conductive coil disposed within the rearward extension of the actuator arm and between the top and bottom plates, while overlying the magnet in a plane parallel to the magnet. In operation, current passes through the coil and interacts with the magnetic field of the magnet so as to rotate the actuator arm around its pivot and thus positioning the transducer as desired.

The magnetic media disk or disks in the disk drive are mounted to a spindle. The spindle is attached to a spindle motor which rotates the spindle and the disks to provide read/write access to the various portions on the concentric tracks on the disks.

The actuator in the disk drive must be capable of a sufficient range of motion so that the transducer/slider combination attached to the suspension can access the maximum usable area of the disk surface to provide the most efficient use of the magnetic storage media and thus achieve the high data density desirable in data storage devices. Circumferential data tracks on the disk are written in a band extending radially from as far to the outer diameter of the disk (OD) as allowed by the necessity of keeping the entire slider over the disk and as far to the inner diameter of the disk (ID) as allowed without the slider or the suspension contacting the spindle on which the disk is mounted.

When the disk drive is not in operation, the disks are not rotating so that the air-bearing that supports the slider during operation is no longer provided. In the stopped condition, the slider rests in contact with the disk surface. When the disk drive is started, the slider stays in sliding contact with the disk surface until the disk achieves sufficiently high radial velocity to provide the air bearing that supports the slider in the operating condition. When the disk drive is shut down, the actuator locates the slider at the start/stop zone and then the spindle motor is turned off causing the disk or disks to stop rotating, resulting in the slider or sliders contacting the disk when the air-bearings can no longer support their load. The surface of the disks in the start/stop zone is usually specially textured to provide a low sticking and high durability interface, resulting in easy starting and low wear.

In the present art, a common practice reserves a radial band approximately the width of the slider at the ID of the available disk area for use as a start/stop zone. In normal operation, the actuator positions the transducer/slider/suspension combination radially with respect to the disk as described above. The inner and outer radial limits of the slider/suspension combination are established by mechanical limit stops which constrain the motion of the actuator positioning arm on which the suspension or suspensions are mounted. These limit stops are located near the rearward extensions of the actuator positioning arm. The ID limit stop limits actuator radial motion to define the innermost radius of the disk surface that can be accessed by the slider without danger of contact with the disk spindle. The OD limit stop limits actuator radial motion to define the outermost usable radius of the disk surface that can be accessed by the slider without danger of the slider running off the flat surface at the OD edge of the disk. The inner and outer radial limits of the slider/suspension combination with respect to the disk surface are required for safely restricting the radial position in case of drive electronics failure and to establish reference radii on the disk to provide information for recovery from a failure.

Because of the high density of data storage on the disks in a disk drive and to maximize the disk area available for user data, it is important to minimize the radial distance over the disk required to decelerate and stop the sliders during impact of the actuator with the limit stops. Equally important, the vibration of the slider/suspension combination induced by rapid deceleration of the actuator assembly on impact with the limit stops must be minimized to prevent damage to the slider or the disk caused by intermittent contacts. In the prior art, these requirements for effective limit stop design have been addressed and will be described briefly.

Many approaches to limit stop design exist in the prior art, all of which are directed to 1) keeping crash impact deflections as small as possible to maximize the disk area available for data storage and 2) keeping crash impact deceleration levels as low as possible to provide the highest possible margin for slider and/or disk damage from intermittent contacts.

A common approach is to completely form the limit stops of soft elastic or elastomeric materials to dissipate impact energy efficiently while limiting the impact deflections.

An alternative approach is to design the limit stops to include a spring or springs which can be suitably preloaded to more efficiently absorb the actuator impact energy resulting in smaller limit stop deflection to bring the actuator to rest. U.S. Pat. No. 5,455,726 issued to Liu describes a limit stop comprising a cantilever arrangement preloaded to improve dynamic energy absorption during crash stops. U.S. Pat. No. 5,369,538 issued to Moe et al. describes a limit stop comprising springs preloaded against reaction elements of the housing, the springs carrying stopping posts for the actuator arm. U.S. Pat. No. 4,796,131 issued to Chang describes a preloaded stop which includes a U-shaped spring mounted on a base plate.

The limit stops and materials used therein described in the prior art have several disadvantages which severely constrain their utility in practice. Elastomer or visco-elastic material parts generally have poor dimensional control and geometric precision requiring large tolerances which wastes valuable disk space. Dimensional stability of parts formed from these materials change with time, temperature and loading. Limit stops formed of these materials tend to adhere to the actuator when loaded against it for long periods (sticky limit stops). The materials generally have high outgassing characteristics leading to contamination of the disk drive components which can result in serious corrosion or stiction problems.

Limit stops that comprise preloaded spring arrangements are generally complex mechanical devices with many parts which adds to manufacturing complexity and cost. In addition, with many parts in the limit stop device, control of dimensional tolerances is much more difficult in the assembly of the limit stops in disk drives so that more disk space needs to be allocated for the limit stops.

It therefore can be seen that there is a need for a limit stop that can be fabricated with few parts and within well-defined mechanical tolerances, that minimizes impact deflections, limits impact deceleration levels, has good dimensional stability with time, temperature and loading, and has low outgassing characteristics.

SUMMARY OF THE INVENTION

To overcome the limitations of the background art described above, and to overcome other limitations that will become apparent upon reading and understanding the present specification, the present invention discloses an improved limit stop for use in disk drives. It is one object of the invention to provide an improved limit stop that has the property of very good energy dissipation, thereby resulting in low deceleration levels with small displacements during impact. It is a further object of the present invention to provide a limit stop configuration with high dimensional tolerance control. It is a still further object of the present invention to provide a limit stop with few parts and simple configuration.

In accordance with these objects, the present invention is a limit stop for magnetic storage disk drive systems comprising a spring portion and a mount portion. The spring portion is a single piece molded structure that is preloaded against a precision machined surface on the mount portion during assembly. The preloaded spring feature provides good energy absorption characteristics to reduce the limit stop deflection during actuator crash stops. The precision machined surface on the mount post accurately determines the limit stop position, reducing tolerance requirements on the spring portion. The surface of the preloaded spring on the spring portion of the limit stop that contacts the actuator positioning arm during a crash stop is also in contact with the precision machined surface of the mount post. This feature of using the same surface for precision alignment and for crash stop impact allows a simple design to satisfy the positioning accuracy requirements without requiring high tolerances of the limit stop parts.

In a preferred embodiment, the limit stop of the present invention comprises two elements, a mount post with a precision machined surface and a spring portion preloaded during assembly against the precision machined surface. In this embodiment, the mount post is an integral part of the disk drive base formed as a boss on the inside of the disk drive base. The spring portion is a molded plastic part that is accurately located with respect to the actuator by being loaded against the precision machined surface in the same operation that preloads the spring for optimum energy absorption during a crash stop. Because of the method of accurately locating the critical surface of the spring portion of the limit stop of this invention, dimensional tolerances of the spring portion can be relatively loose, or high, which reduces cost and simplifies manufacture and assembly.

BRIEF DESCRIPTION OF THE DRAWINGS

For a fuller understanding of the nature and advantages of the present invention, as well as of the preferred mode of use, reference should be made to the following detailed description read in conjunction with the accompanying drawings. In the following drawings, like reference numerals designate like or similar parts throughout the drawings.

FIGS. 5a, 5b and 5c are elevation, plan and section views respectively of the molded spring portion of the limit stop.

FIGS. 6a and 6b are elevation and plan views of the spring portion inserted in the mount post illustrating the partially compressed limit stop spring portion.

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
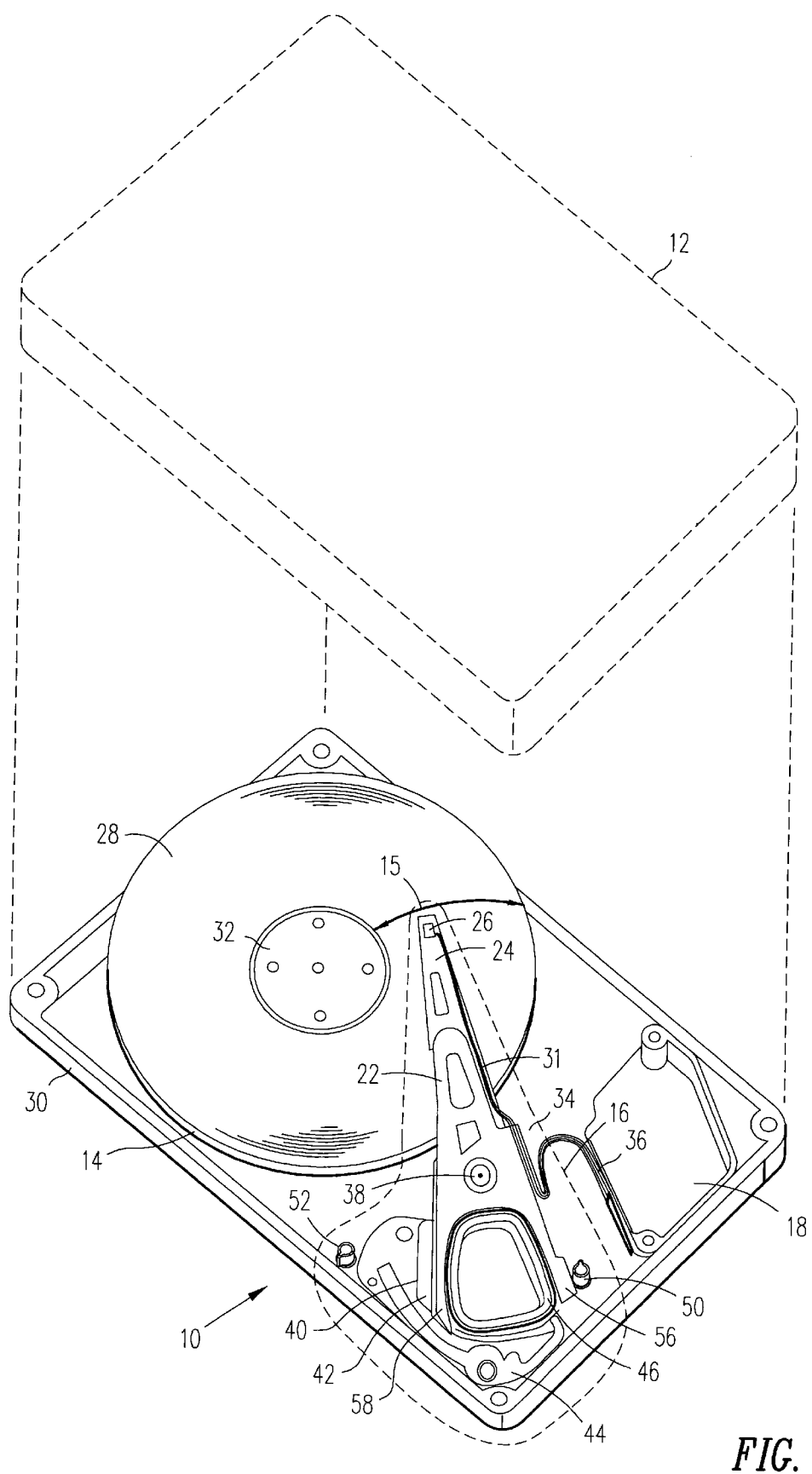
FIG. 1 is a perspective view of the disk drive of the present invention generally illustrating the relative placement of the disks, actuator and limit stops of this invention.

FIG. 1 shows a disk drive system designated by the general reference number 10. The lid 12 of the disk drive 10 is shown exploded and in phantom. In operation, the lid would be disposed on top of the disk drive base 30.

The disk drive 10 comprises one or more magnetic disks 14. The disks 14 may be conventional particulate or thin film recording disks, which are capable of storing digital data in concentric tracks. In a preferred embodiment, both sides of the disks 14 are available for storage, and it will be recognized by one of ordinary skill in the art that the disk drive 10 may include any number of such disks 14.

The disks 14 are mounted to a spindle 32. The spindle 32 is attached to a spindle motor which rotates the spindle 32 and the disks 14 to provide read/write access to the various portions of the concentric tracks on the disks 14.

An actuator assembly 16, in accordance with the present invention is indicated by the dashed lines in FIG. 1. The actuator assembly 16 includes an actuator positioning arm 22, and a suspension assembly 24. The suspension assembly 24 includes a slider/transducer assembly 26 at its distal end. Although only one slider/transducer assembly 26 of the suspension assembly 24 is shown, it will be recognized that the disk drive 10 has one slider/transducer assembly 26 for each side of each disk 14 included in the drive 10. The actuator positioning arm 22 further comprises a pivot 38 around which the actuator positioning arm 22 pivots.

The disk drive 10 further includes a read/write chip 34. As is well known in the art, the read/write chip 34 cooperates with the read/write transducer on the slider/transducer assembly 26 to read or write to the disks 14. A flexible printed circuit member 36 carries digital signals between the chip 34 and a connector pin assembly 18 which interfaces with the external signal processing electronics. One or more electrical conductors 31 are routed along the pivot arm 22 and suspension 24 to carry electrical signals to and from the read/write transducer on the slider/transducer assembly 26.

The main function of the actuator assembly 16 is to move the positioner or actuator arm 22 around the pivot 38. Part of the actuator assembly 16 is the voice coil motor (vcm) which comprises the vcm bottom plate 40, the magnet 42 and the vcm top plate (not shown to expose the rest of the actuator assembly) in combination with the actuator coil 46. Current passing through the coil 46 interacts with the magnetic field of the magnet 42 to rotate the positioner arm 22 and suspension assembly 24 around the pivot 38, thus positioning the slider/transducer assembly 26 as desired. Motion of the actuator positioning arm 22 and suspension assembly 24 over the surface of the disk is shown by arrow 15. Also shown is a latching mechanism 44, known in the art, which serves to secure the position of the actuator positioning arm 22 when the disk drive system 10 is not in operation.

Limit stops 50,52 are located as shown in FIG. 1. The ID limit stop 50 is positioned to limit motion of the right rearward extension of the actuator positioning arm 56 thus limiting the innermost radial position of the slider/transducer assembly 26 relative to the disk surface 28. The OD limit stop 52 is positioned to limit motion of the left rearward extension of the actuator positioning arm 58 thus limiting the outermost radial position of the slider/transducer assembly 26 relative to the disk surface 28.

Figure 2:
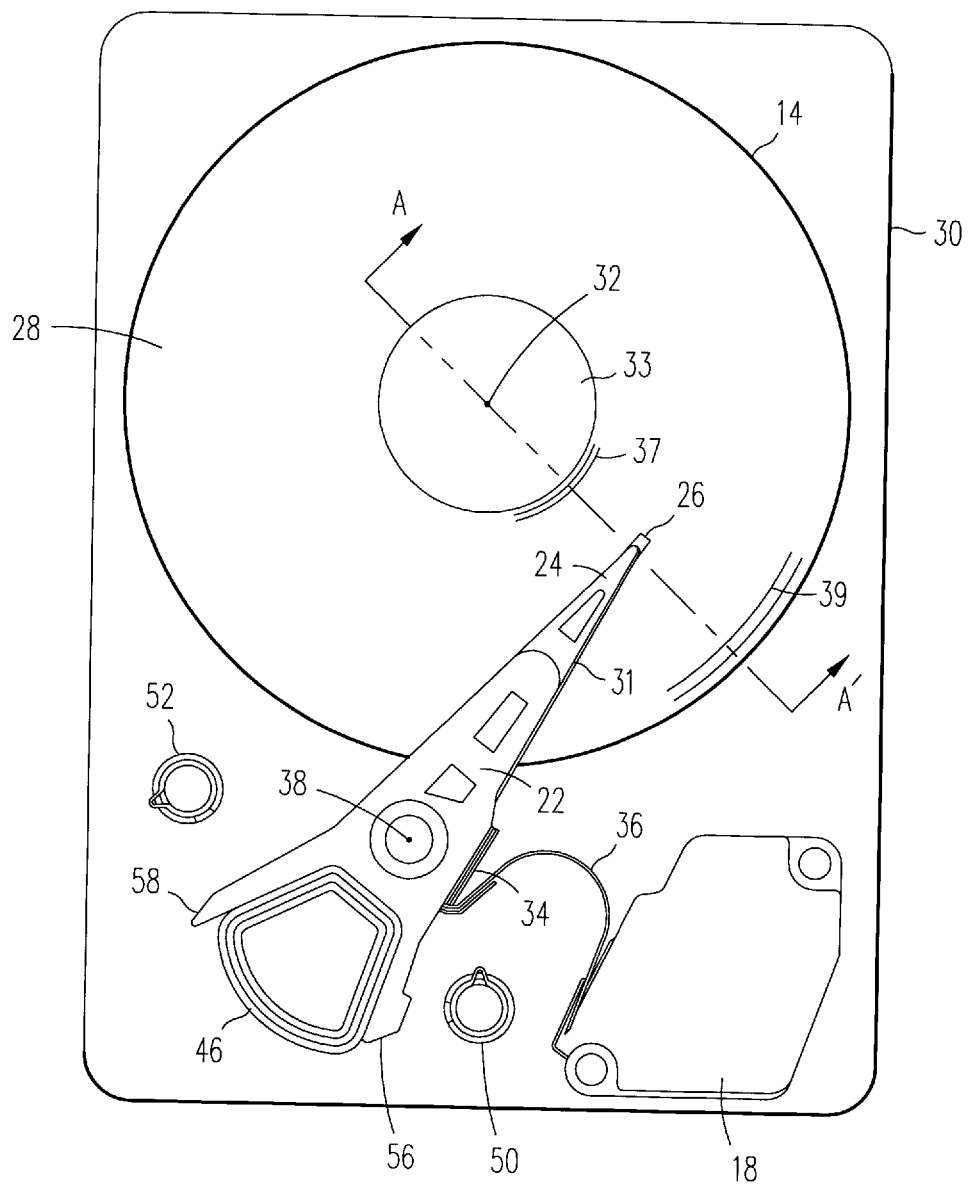
FIG. 2 is a plan view of the actuator and limit stops relative to the disk illustrating the important ID and OD constraints of limit stop tolerances.

FIG. 2 is a plan view illustrating the important ID and OD constraints on the slider/transducer assembly 26 radial position relative to the disk surface 28. The disks 14 are mounted on a drive motor spindle 32 by the clamping action of a clamp ring 33 having a outer diameter slightly larger than the diameter of the inner hole of the disks 14.

Figure 3:
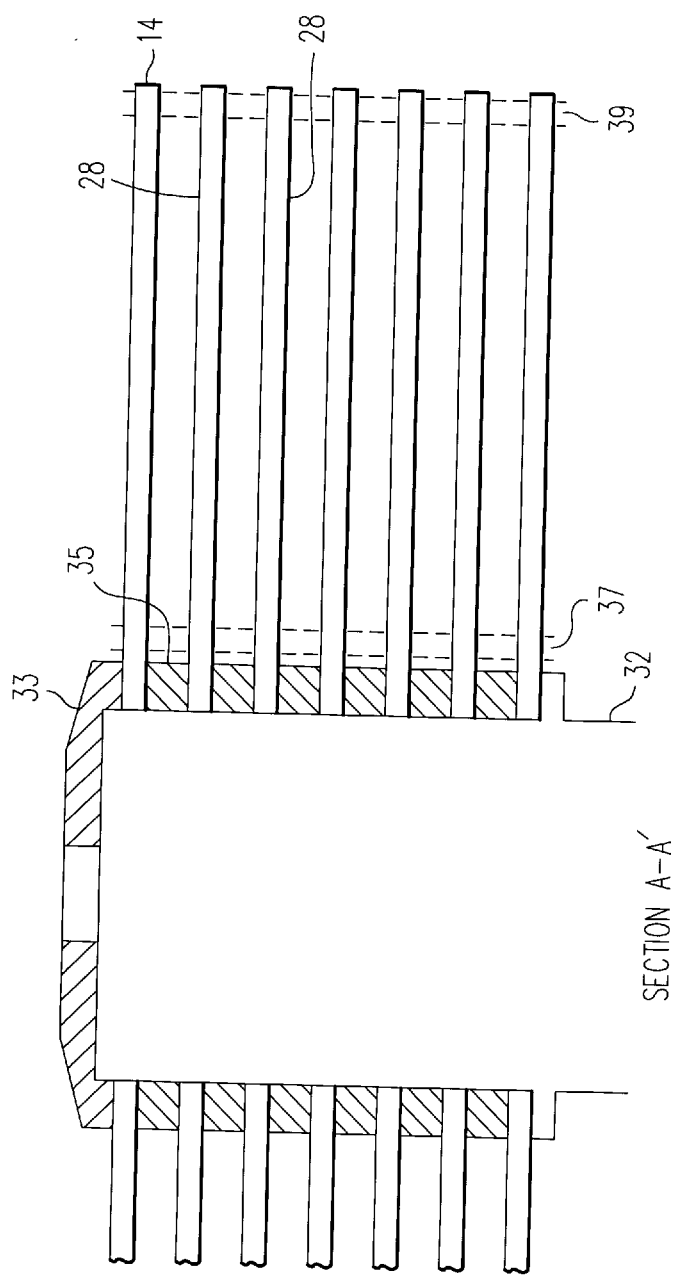
FIG. 3 is a view of section A–A' from FIG. 2 illustrating the ID and OD constraints of crash deflection.

FIG. 3 is a section view through A–A' in FIG. 2 illustrating when a disk drive system 10 has more than one disk 14, spacer rings 35 of generally equal diameter to the clamp ring 33 are placed between the disks 14 in a concentric arrangement with respect to the spindle 32 to form a disk stack with disk-to-disk spacing equal to the height of the spacer rings 35. To prevent damage to either the slider/transducer assembly 26 or the suspension assembly 24, the slider/suspension combination must be prevented from contacting the clamp ring 33 or spacer rings 35 when maximum actuator positioning arm 22 rotation toward the ID occurs. The function of the ID limit stop 50 is to limit rotation of the actuator positioning arm 22 toward the spindle 32 so as to ensure the suspension assembly 24 or slider/transducer assembly 26 does not actually contact the clamp ring 33 or spacer rings 35. Similarly, the maximum rotation of the actuator positioning arm 22 toward the OD of the disk surfaces 28 must be limited to prevent the slider/transducer assembly 26 from being positioned over the OD edge of the disk surface 28 since at this edge the supporting air-bearing will collapse allowing the slider/transducer assembly 26 to be damaged by contact with the disk edge. The function of the OD limit stop 52 is to limit rotation of the actuator positioning arm 22 to ensure adequate margin for the slider/transducer assembly 26 to maintain a stable air-bearing near the disk OD.

Due to the very rapid accessing capability of high performance disk drives, the maximum attainable actuator positioning arm 22 rotation velocity allows impact energies at the ID limit stop 50 and the OD limit stop 52 to reach very high values. Due to the finite deflection of the limit stop material, a wide ID limit stop band 37 and OD limit stop band 39 must be provided at the ID and OD disk radius to provide the necessary safety margin to prevent slider/transducer assembly 26 or suspension assembly 24 damage. These bands must be provided on every disk surface in the disk drive, and since these bands cannot be used for data storage, a significant loss of useful data capacity results.

In the present invention, the limit stops combine a preloaded spring design to minimize limit stop deflection with a precision alignment feature to reduce limit stop location uncertainty due to parts and assembly tolerances. These features result in reduced widths of the ID and OD limit stop bands 37, 39 with significantly improved data capacity for the disk drive.

Figure 4:
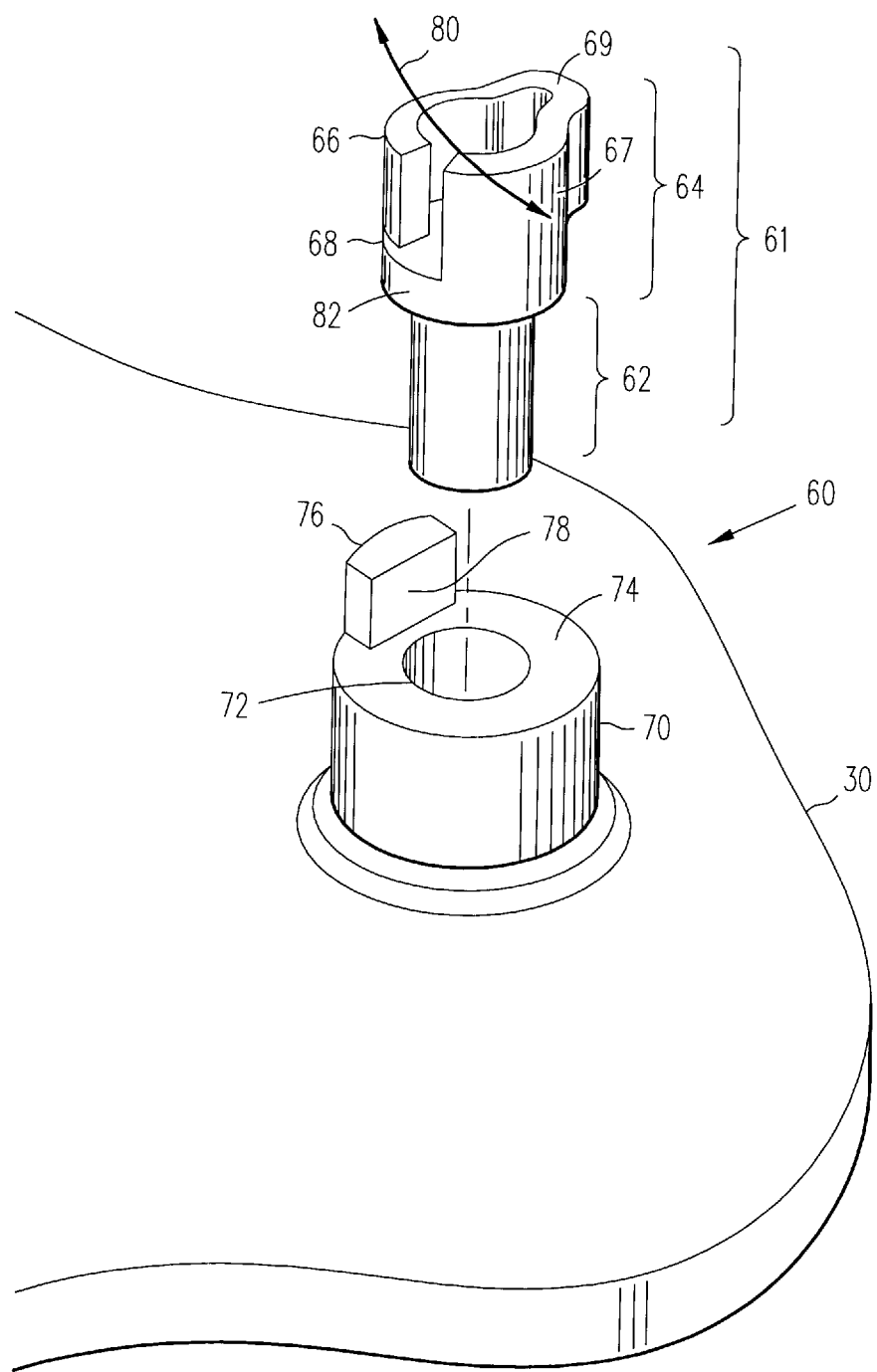
FIG. 4 is an exploded perspective view of the limit stop of the present invention.

A limit stop in accordance with the present invention is shown and described with reference to FIGS. 4, 5 and 6. In a preferred embodiment, FIG. 4 illustrates a perspective view of a limit stop assembly, represented here by numeral 60. In this embodiment, the limit stop assembly 60 comprises a generally cylindrical spring portion 61 and a mount post 70 which locates and supports the spring portion 61. The mount post 70 is an integral part of the disk drive base 30 formed as a raised, cylindrical area during the casting process generally used for manufacturing disk drive housings. The mount post 70 protrudes upward from the disk drive base 30 to a first machined surface 74 which provides the reference height for the spring portion 61. A segment of the mount post 70 forming a stud 76 extends above the machined surface 74. A hole 72 drilled into the mount post 70 perpendicular to the disk drive base 30 provides a press fit for mounting the spring portion 61. The stud 76 has a second precision machined surface 78 that provides the precise location of actuator contact with the limit stop 60.

In the preferred embodiment, the spring portion 61 is a molded plastic part comprising a bottom cylindrical stem 62 and a shaped flexible portion 64, the shaped flexible portion 64 further including a spring 66 and spring support wall 67 separated by hinge area 69. The spring support wall 67 is integrally formed with a supporting surface 82 about the shaped flexible portion 64 until hinge area 69. Supporting surface 82 further includes alignment face 68 which aligns with machined surface 78 of stud 76 when the spring portion 61 is inserted into mount post 70. At hinge area 69, the support wall 67 bows outward forming hinge 69, and becomes separated from the supporting surface 82 by gap 83 (shown in FIGS. 5a and 6a) forming spring 66 which is movable in the direction indicated by arrow 80.

Referring now to FIGS. 5a, 5b and 5c, spring portion 61 is illustrated in elevation and plan views. The elevation view of FIG. 5a shows the spring 66 in the unloaded position. A gap 83 separates the spring 66 from the supporting surface 82 on the side with the alignment face 68. Referring to FIG. 5b, the gap 83 extends just past the hinge area 69 to the spring supporting wall 67. The length, thickness and height of the spring 66 and its shape at the hinge area 69 can be varied to obtain the overall desired spring characteristics of the limit stop. Alternatively, the hinge point is not a necessity, and the spring could be a continuous radius about the flexible portion 64 of the limit stop 60. FIG. 5c shows the plan section B–B' illustrating the alignment surface 68 which determines the rotational orientation of the spring portion 61 when assembled.

Referring now to FIGS. 6a and 6b, the limit stop 60 is shown in elevation and plan views respectively after assembly of spring portion 61 with the mount post 70. The stem 62 of the spring portion 61 is press fit into the hole 72 drilled into the mount post 70. The spring portion 61 must be fully inserted so that the shaped flexible portion 64 is seated against the first machined surface 74 of the mount post 70. To fully insert the spring portion 61, the spring portion 61 must be rotated to orient the alignment surface 68 with the second precision machined surface 78 of the stud 76 on the mount post 70. In addition, the spring 66 on the limit stop 60 must be compressed to clear the second precision machined surface 78 of the stud 76. FIG. 6b shows the shape of the spring 66 after assembly illustrating the preloaded position of spring 66 against the second precision machined surface 78 of stud 76.

Figure 7:
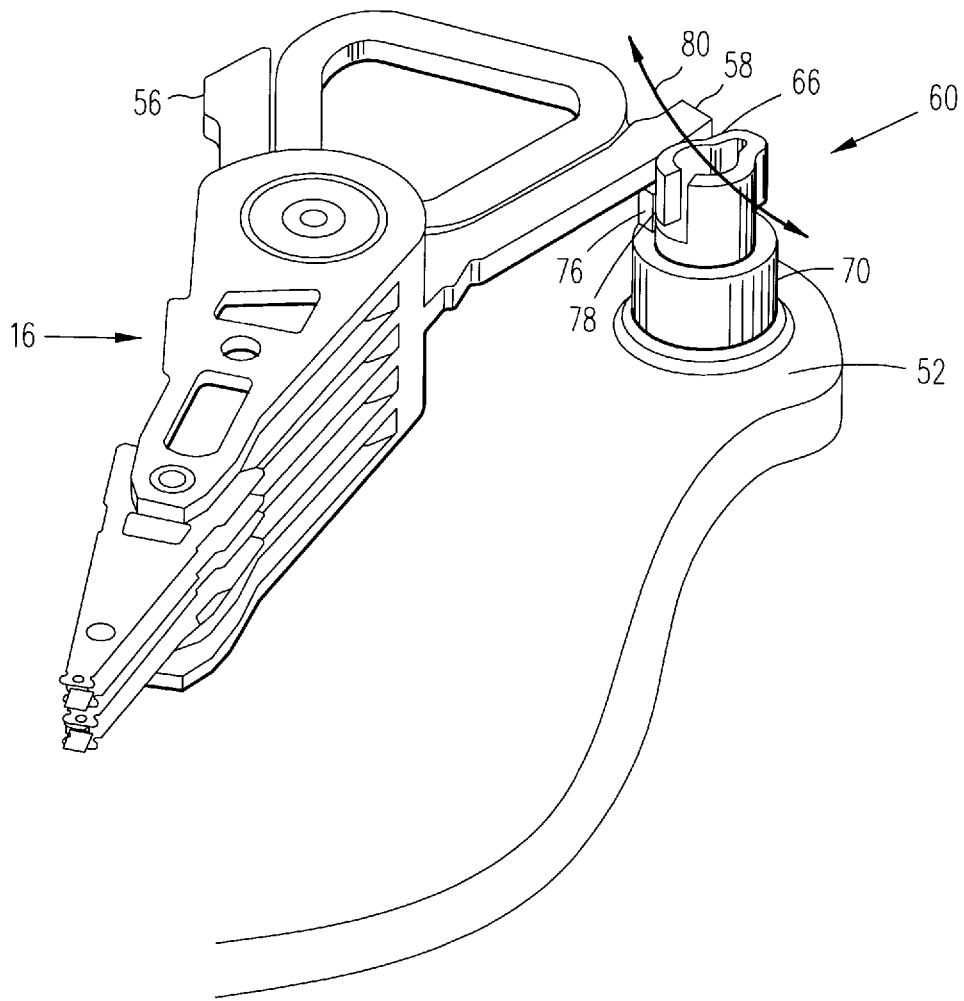
FIG. 7 is a perspective view of the OD limit stop with the rearward extension of the actuator positioning arm contacting the limit stop spring portion.

Referring now to FIG. 7, a perspective view is shown of the actuator assembly 16 and the limit stop 60 at the position of OD limit stop 52 contact. The OD limit stop 52 is located relative to the actuator assembly 16 so that the rearward extension of the actuator positioning arm 58 is parallel to and just above the precision machined surface 78 of the stud 76 on the limit stop mount post 70. With this alignment, the rearward extension of the actuator positioning arm 58 contacts spring 66 at the exact location determined by the precision machined surface 78. Energy at contact is absorbed and dissipated by the spring 66 so that deflection of the actuator is minimized. With the limit stop of the present invention, the location of the OD limit stop 52 only depends on the accuracy of the location of the precision machined surface 78 and is no longer dependent on tolerances of the limit stop component parts.

The limit stop 60 of the present invention at the ID position 50 comprises a similar mount post and spring portion combination as the OD limit stop 52 described above in detail. The mount post 70 is located on the disk drive base 30 at an appropriate location for the ID limit stop relative to the actuator assembly 16. The stud 76 and the precision machined surface 78 are located and oriented at the desired locations for the ID limit stop 50 to contact the rearward extension of the actuator extension arm 56 in order to limit actuator motion toward the ID of the disk. The limit stop 60 is an identical part for both the OD limit stop 52 and the ID limit stop 50. Referring back to FIG. 2, the location and orientation of the ID limit stop 50 and the OD limit stop 52 are shown relative to the actuator positioning arm 22.

The precision of the limit stops of the present invention depends on accurate positioning and alignment of the precision machined surfaces on the limit stop mount posts relative to the spindle motor and actuator bearing positions. During disk drive fabrication, precision machining processes are used to accurately locate and drill mounting holes in the disk drive base for the spindle motor and actuator bearing. As a part of this precision machining process, the same tools can be used to locate and drill ID and OD limit stop mount holes in the limit stop mount bosses and to precisely locate and machine the precision machined surfaces on both the ID and the OD limit stop mount posts.

Because the contact surface of the limit stop spring is preloaded against the precision machined surface, all the tolerances of the molded limit stop parts are no longer a factor in determining precision of the limit stop position. Using the limit stop of this invention, the present inventors have improved limit stop positional tolerance over the prior art from 120 micrometers to 20 micrometers. For a 3.5" disk drive, this improved position tolerance allows an increase of approximately 160 micrometers in usable disk radius at both the ID and the OD of every disk surface in the disk drive.

While the preferred embodiments of the present invention have been illustrated herein in detail, it should be apparent that modifications and adaptations to those embodiments may occur to those skilled in the art without departing from the scope of the present invention as set forth in the following claims.

What is claimed is:

1. A limit stop for use in a magnetic storage system comprising:
   a mount post having a first machined surface and a bore hole through the center of the mount post; and
   a spring portion comprising a cylindrical stem insertable into the bore hole and a shaped flexible portion, the shaped flexible portion further comprising a spring supporting wall formed with a supporting surface atop the cylindrical stem, a spring and a hinge area separating the spring and spring supporting wall.

2. The limit stop as claimed in claim 1, further comprising a stud extending perpendicular from the first machined surface and contacting and compressing the spring when the cylindrical stem is inserted into the bore hole.

3. The limit stop as claimed in claim 2, further comprising a second machined surface on the side of the stud which contacts the spring.

4. The limit stop as claimed in claim 3, further comprising an alignment face on the side of the supporting surface below the spring, the alignment face aligning with the second machined surface on the stud when the cylindrical stem is inserted into the bore hole.

5. The limit stop as claimed in claim 4, wherein the hinge area comprises a c-shaped bend in the spring supporting wall separated from the supporting surface by a gap.

6. The limit stop as claimed in claim 5 wherein the spring portion comprises a molded plastic part.

7. The limit stop as claimed in claim 5, wherein said spring portion comprises a machined metal part.

8. The limit stop as claimed in claim 5, wherein said post comprises a boss formed on the inside of a disk drive base.

9. The limit stop as claimed in claim 5, wherein said post comprises a metal post fixed to the inside of a disk drive base.

10. The limit stop as claimed in claim 5, wherein the spring portion is deformed to preload said limit stop.

11. A magnetic storage system comprising:

a disk with a data surface of concentric data tracks;

a spindle shaft supporting said disk, said spindle shaft for rotating said disk about an axis generally perpendicular to the disk;

a slider maintained in operative relationship with the data surface when the disk is rotating;

a transducer attached to the slider for reading data from and writing data to the data surface;

an actuator for moving the slider generally radially relative to the disk to allow the transducer to access the data tracks, said actuator comprising a forward portion for supporting said slider, a central portion rotatably supported by a rotational shaft through bearings and a v-shaped rearward portion;

an electronics module for processing data read from and written to the data surface;

a suspension for connecting said slider to said actuator;

support means for supporting said spindle shaft and actuator;

at least one limit stops attachable to said support means proximate at least one of the outer sides of said v-shaped rearward portion of said actuator, said limit stop comprising:

a mount post having a first machined surface and a bore hole through the center of the mount post; and a spring portion comprising a cylindrical stem insertable into the bore hole and a shaped flexible portion, the shaped flexible portion further comprising a spring supporting wall formed with a supporting surface atop the cylindrical stem, a spring and a hinge area separating the spring and spring supporting wall.

12. The magnetic storage system as claimed in claim 11, further comprising a stud extending perpendicular from the first machined surface and contacting and compressing the spring when the cylindrical stem is inserted into the bore hole.

13. The magnetic storage system as claimed in claim 12, further comprising a second machined surface on the side of the stud which contacts the spring.

14. The magnetic storage system as claimed in claim 13, further comprising an alignment face on the side of the supporting surface below the spring, the alignment face aligning with the second machined surface on the stud when the cylindrical stem is inserted into the bore hole.

15. The magnetic storage system as claimed in claim 14, wherein the hinge area comprises a c-shaped bend in the spring supporting wall separated from the supporting surface by a gap.

16. The magnetic storage system as claimed in claim 15 wherein the spring portion comprises a molded plastic part.

17. The magnetic storage system as claimed in claim 15, wherein said spring portion comprises a machined metal part.

18. The magnetic storage system as claimed in claim 15, wherein said post comprises a boss formed on the inside of a disk drive support means.

19. The magnetic storage system as claimed in claim 15, wherein said post comprises a metal post fixed to the inside of a disk drive support means.

20. The magnetic storage system as claimed in claim 15, wherein the spring portion is deformed to preload said limit stop.

* * * * *